US012491648B2

(12) United States Patent
Lap et al.

(10) Patent No.: US 12,491,648 B2
(45) Date of Patent: Dec. 9, 2025

(54) SHAVING UNIT AND ELECTRIC SHAVER COMPRISING A MAIN BODY AND A SHAVING UNIT

(71) Applicant: KONINKLIJKE PHILIPS N.V., Eindhoven (NL)

(72) Inventors: Reinder Niels Lap, Surhuizum (NL); Marc Alexander Pastoors, Gieten (NL); Marius Iosif Boamfa, Veldhoven (NL); Babu Varghese, Eindhoven (NL); Rieko Verhagen, Vught (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 273 days.

(21) Appl. No.: 17/773,631

(22) PCT Filed: Sep. 23, 2021

(86) PCT No.: PCT/EP2021/076132
§ 371 (c)(1),
(2) Date: May 2, 2022

(87) PCT Pub. No.: WO2022/069324
PCT Pub. Date: Apr. 7, 2022

(65) Prior Publication Data

US 2023/0347534 A1 Nov. 2, 2023

(30) Foreign Application Priority Data

Sep. 30, 2020 (EP) .................................... 20199181

(51) Int. Cl.
*B26B 19/38* (2006.01)
*B26B 19/14* (2006.01)
*B26B 19/46* (2006.01)

(52) U.S. Cl.
CPC .......... *B26B 19/382* (2013.01); *B26B 19/146* (2013.01); *B26B 19/3873* (2013.01); *B26B 19/46* (2013.01)

(58) Field of Classification Search
CPC ... B26B 19/38; B26B 19/3806; B26B 19/382; B26B 19/146; B26B 19/46
See application file for complete search history.

(56) References Cited

U.S. PATENT DOCUMENTS 5,065,515 A * 11/1991 Iderosa .................. B26B 21/48
83/16
6,161,288 A * 12/2000 Andrews ................ B26B 29/00
30/527

(Continued)

FOREIGN PATENT DOCUMENTS

CN 108714917 A 10/2018
DE 9100850 U1 7/1991

(Continued)

OTHER PUBLICATIONS

International Search Report and Written Opinion Dated Jan. 7, 2022 For International Application No. PCT/EP2021/076132 Filed Sep. 23, 2021.

*Primary Examiner* — Adam J Eiseman
*Assistant Examiner* — Richard D Crosby, Jr.

(57) ABSTRACT

A shaving unit (20) for use in an electric shaver (1) comprises at least one hair-cuffing unit (21) comprising an external cutting member (23) having hair-entry openings (24) in a cutting track surface (25) and an internal cutting member having at least one hair-cutting element and being movable relative to the external cutting member (23), and a base member (22) supporting the at least one hair-cutting unit (21). The shaving unit (20) further comprises at least one skin-heating unit (30) comprising a skin-contacting member (31) having a skin-contacting surface (32) arranged (Continued)

adjacent to the at least one hair-cutting unit (21) to contact the skin during use of the shaving unit (20), and at least one infrared or near-infrared light source (33) integrated in the skin-contacting member (31), thermally coupled to the skin-contacting surface (32) and arranged to emit infrared or near-infrared light via the skin-contacting surface (32).

14 Claims, 3 Drawing Sheets

(56) References Cited

U.S. PATENT DOCUMENTS

| | | | | |
|---|---|---|---|---|
| 8,122,606 | B2 * | 2/2012 | Hart | B26B 21/4087 30/41.7 |
| 11,014,255 | B2 * | 5/2021 | Robertson | B26B 21/225 |
| 11,613,035 | B2 * | 3/2023 | Bourque | B26B 21/521 30/526 |
| 11,623,357 | B2 * | 4/2023 | Robertson | B26B 21/523 30/527 |
| 2002/0120278 | A1 | 8/2002 | Cense | |
| 2004/0098862 | A1 * | 5/2004 | Orloff | B26B 21/521 30/41.7 |
| 2008/0103560 | A1 * | 5/2008 | Powell | A61N 5/0616 607/94 |
| 2012/0227266 | A1 | 9/2012 | Meijer | |
| 2013/0227841 | A1 * | 9/2013 | Solomon | A61B 18/203 30/34.05 |
| 2015/0128776 | A1 * | 5/2015 | Zuidervaart | B26B 19/388 30/34.2 |
| 2015/0197018 | A1 * | 7/2015 | Heubach | B26B 21/4062 30/34.05 |
| 2015/0298326 | A1 * | 10/2015 | Tomassetti | B26B 21/48 30/34.05 |
| 2015/0298327 | A1 * | 10/2015 | Tomassetti | B26B 21/56 30/34.05 |
| 2015/0360377 | A1 * | 12/2015 | Tomassetti | B26B 21/4012 30/34.05 |
| 2016/0167241 | A1 * | 6/2016 | Goldfarb | B26B 21/4056 30/41.7 |
| 2016/0375597 | A1 * | 12/2016 | Broemse | B26B 21/225 30/34.05 |
| 2017/0282387 | A1 * | 10/2017 | Robertson | B26B 21/4062 |
| 2017/0325566 | A1 * | 11/2017 | Franklin | B26B 19/388 |
| 2018/0021965 | A1 * | 1/2018 | Phoon | B26B 19/20 30/202 |
| 2019/0061183 | A1 * | 2/2019 | Neyer | B26B 19/388 |
| 2020/0316800 | A1 * | 10/2020 | Beerwerth | H05K 7/2039 |

FOREIGN PATENT DOCUMENTS

| | | | |
|---|---|---|---|
| DE | 29611519 | U1 | 9/1996 |
| DE | 102019004680 | A1 | 8/2020 |
| KR | 0123373 | B1 | 12/1997 |
| WO | 2008/052151 | A2 | 5/2008 |
| WO | 2009/090632 | A2 | 7/2009 |

* cited by examiner

Fig. 1
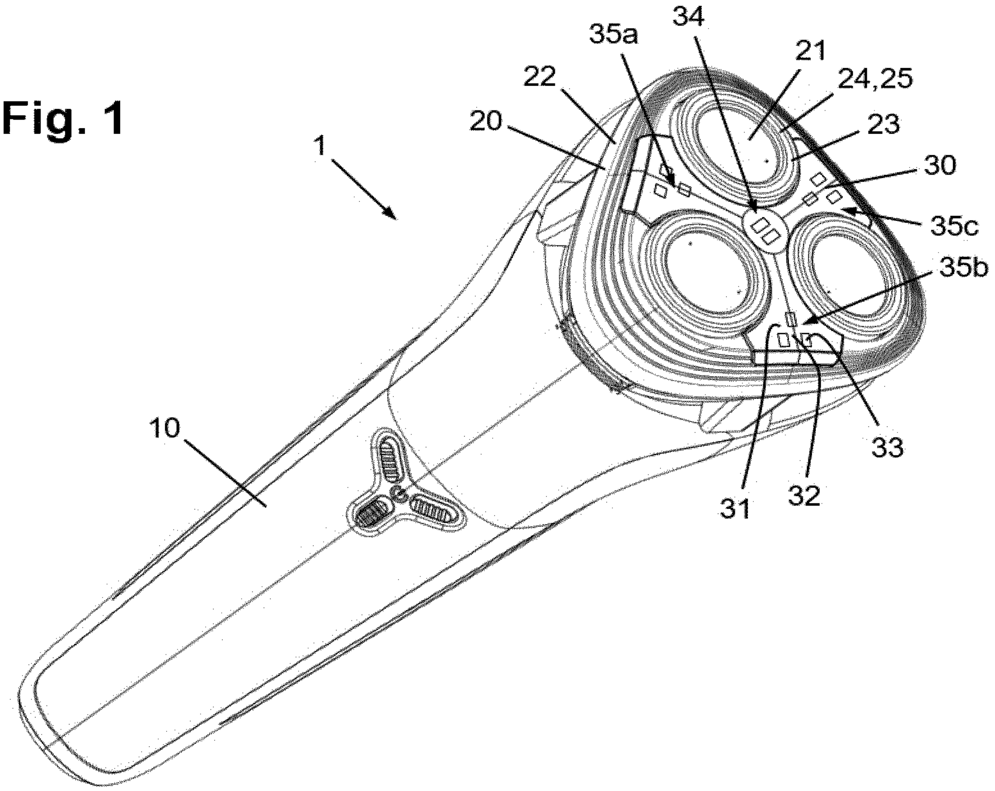
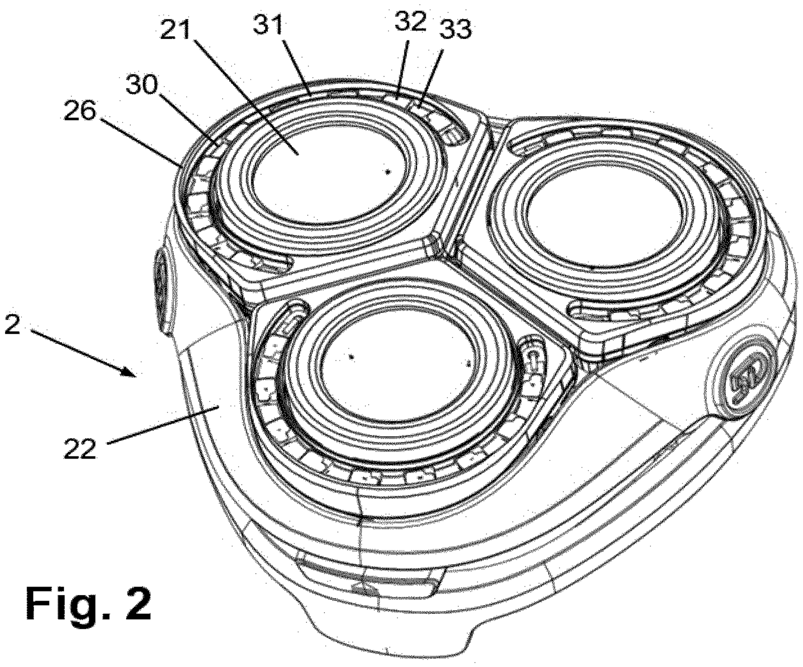
Fig. 2

SHAVING UNIT AND ELECTRIC SHAVER COMPRISING A MAIN BODY AND A SHAVING UNIT

CROSS REFERENCE TO RELATED APPLICATIONS

This application is the U.S. National Phase application under 35 U.S.C. § 371 of International Application No. PCT/EP2021/076132 filed Sep. 23, 2021, which claims the benefit of European Patent Application Number 20199181.7 filed Sep. 30, 2020. These applications are hereby incorporated by reference herein.

FIELD OF THE INVENTION

The invention relates to a shaving unit, comprising: at least one hair-cutting unit comprising an external cutting member having hair-entry openings in a cutting track surface and an internal cutting member having at least one hair-cutting element and being movable relative to the external cutting member; a base member supporting the at least one hair-cutting unit; and at least one skin-heating unit.

Further, the invention relates to an electric shaver comprising a main body and a shaving unit as described here before.

BACKGROUND OF THE INVENTION

The invention is in the field of shavers, particularly electric shavers which are designed to perform shaving actions and the like in which hairs are cut at a position close to the skin. In general, an electric shaver comprises a shaving unit where one or more hair-cutting units are located, wherein the shaving unit comprises a base member for the purpose of supporting the one or more hair-cutting units. A particularly common design of the shaving unit uses three hair-cutting units in an equilateral triangular configuration. An electric shaver comprises a main body besides the shaving unit. The main body is normally shaped so as to be suitable to be taken hold of by a user of the shaver and may accommodate various components of the shaver such as an electric motor.

Each hair-cutting unit of the shaving unit comprises a combination of an internal cutting member and an external cutting member which is arranged to cover the internal cutting member, the external cutting member being provided with a series of hair-entry openings for allowing hairs to reach through the external cutting member and encounter the internal cutting member during a shaving action. In a practical design, the external cutting member is generally cup-shaped and has a substantially circular periphery, wherein the hair-entry openings may be shaped like elongated slits extending substantially radially with respect to a central axis of the external cutting member, in one or more annular areas making up one or more hair-cutting tracks. Such an external cutting member is particularly suitable to be used in an electric shaver of the rotary type, i.e. an electric shaver including at least one hair-cutting unit in which the internal cutting member is arranged so as to rotate during operation.

Proper use of the electric shaver involves putting the shaver to an active state, i.e. a state in which the internal cutting member of the at least one hair-cutting unit is rotated, and moving the shaving unit over a portion of skin to be subjected to a shaving action. The external cutting member has a hair-cutting track surface for contacting a portion of skin at the position of the one or more hair-cutting tracks during a hair-cutting action. At positions where the hair-entry openings are delimited, hair-cutting surfaces are present in the external cutting member. In a common design, the internal cutting member includes blades having hair-cutting edges. During a shaving action, hairs entering the hair-entry openings are sheared between the hair-cutting surfaces and the hair-cutting edges, and get cut off at a position close to the skin as a result thereof.

CN 108714917 A discloses an electric shaver comprising a shaving unit and a main body. The shaver is equipped with an infrared heating device, a battery and a switch electrically connected to each other. The battery is used to power the infrared heating device and the switch is used to control emission of infrared light from the infrared heating device. The infrared heating device is arranged at a central position in the shaving unit, and an output end of the infrared device is arranged so as to face the skin during a shaving action, wherein the output light is in the form of conical diffusion. The infrared heating device is installed inwardly on the surface of the shaving unit to ensure that when the shaving unit is in the intended position relative to the skin for the purpose of performing a shaving action, there is a certain gap between the infrared heating device and the skin.

A reason for equipping an electric shaver with an infrared heating device such as known from CN 108714917 A is found in the fact that exposure of hairs to infrared light helps to soften the hairs. In general, exposure of hairs to infrared light during a shaving action improves the comfort experienced by the user. Also, the infrared light may have a beneficial effect on the skin, stimulating the skin and invoking a radiant look of the skin.

WO 2008/052151 A2 discloses a rotary shaver phototherapy device and a foil shaver phototherapy device. The shavers comprise a LED array disposed adjacent to, respectively, the rotary shaving heads and the shaving foils to provide a light therapy treatment to a user simultaneously with a shaving process. The LED array may be capable of transmitting various wavelengths of light for a plurality of different treatments, e.g. blue, red, yellow, green, ultraviolet, infrared, and combinations thereof.

DE 296 11 519 U1 discloses a shaving apparatus having a shaving head and a low-level laser irradiation device for projecting a laser beam via the shaving head on the skin surface. The laser irradiation causes a faster healing of skin lesions resulting from the shaving process. In a first embodiment the laser irradiation device comprises a laser diode arranged in the shaving head. In other embodiments the laser irradiation device comprises a laser diode arranged in a grip portion of the shaving apparatus, and the laser light is guided via a light guide to one or more lenses in the shaving head via which the laser light exits the shaving head at a skin facing side thereof. Alternatively the laser light is fed into a light channel that extends circumferentially around the shaving head, so that a more regular distribution of the light exposed to the skin is obtained.

DE 91 00 850 U1 discloses an electric shaver comprising a shaving head having UV-A light sources that are arranged to increase the visibility of beard hairs during the shaving process. The UV-A light sources have an additional skin tanning effect and may treat acne.

WO 2009/090632 A2 discloses an applicator for hair removal comprising a mechanical hair removal mechanism, one or more illumination sources configured to provide illumination with one or more wavelengths, and a direction sensor configured to activate at least one illumination source according to the applicator displacement direction over the skin. In particular, the illumination sources are arranged at two main sides of the hair removal mechanism and they are activated such that, when the applicator is displaced in a direction perpendicular to said main sides, the trailing illumination source illuminates a segment of skin from which the hair removal mechanism has removed hair to destroy or weaken any hair follicles that are left and to provide a skin healing effect.

SUMMARY OF THE INVENTION

It is an object of the invention to make improvements to what is known in the art of applying an infrared heating device in an electric shaver. Therefore, the invention aims to provide a practical way of exposing the skin and the hairs on the skin to infrared or near-infrared light during a shaving action, which yields good results when it comes to efficiency of the skin-heating unit, shaving comfort and skin stimulation.

In view of the foregoing, the invention provides a shaving unit, comprising: at least one hair-cutting unit comprising an external cutting member having hair-entry openings in a cutting track surface and an internal cutting member having at least one hair-cutting element and being movable relative to the external cutting member; a base member supporting the at least one hair-cutting unit; and at least one skin-heating unit comprising: a skin-contacting member having a skin-contacting surface arranged adjacent to the at least one hair-cutting unit to contact the skin during use of the shaving unit; and at least one infrared or near-infrared light source integrated in the skin-contacting member, thermally coupled to the skin-contacting surface and arranged to emit infrared or near-infrared light via the skin-contacting surface.

It follows from the foregoing that the shaving unit according to the invention comprises at least one hair-cutting unit, a base member supporting the at least one hair-cutting unit, and at least one skin-heating unit comprising a skin-contacting member. The skin-contacting member of the at least one skin-heating unit has a skin-contacting surface arranged adjacent to the at least one hair-cutting unit to contact the skin during use of the shaving unit. Further, the skin-heating unit comprises at least one infrared or near-infrared light source integrated in the skin-contacting member, thermally coupled to the skin-contacting surface and arranged to emit infrared or near-infrared light via the skin-contacting surface. On the basis of this configuration, it is achieved that, when the at least one skin-heating unit is activated during a shaving action, the skin is heated both by the infrared or near-infrared light and by the heat generated by the at least one infrared or near-infrared light source. In general, any light source has a limited efficiency in converting electric power into optical power. Part of the electric power supplied to a light source is converted into thermal energy. According to the invention, the at least one infrared or near-infrared light source is integrated in the skin-contacting member in such a way that a substantial part of this thermal energy is conducted to the skin-contacting surface of the skin-contacting member as a result of the thermal coupling of the at least one infrared or near-infrared light source to the skin-contacting surface. Thus, the infrared or near-infrared light is emitted to the skin from an appropriate position adjacent to the at least one hair-cutting unit and, in addition, heat generated by the at least one infrared or near-infrared light source due to its limited electric-to-optical conversion efficiency is transferred to the skin from such appropriate position as well, in an optimal manner involving direct contact to the skin. This results in an overall improvement of the efficiency of the at least one infrared or near-infrared light source to heat the skin. The invention also enables the use of relatively low-power light sources, such as LEDs, to be more effectively used for heating the skin.

In the framework of the invention, various options exist in respect of the way in which the skin-contacting surface is shaped and positioned relative to the at least one hair-cutting unit. According to a first feasible option, the skin-contacting surface of the skin-contacting member of the at least one skin-heating unit is arranged to at least partially encompass the at least one hair-cutting unit, wherein the at least one skin-heating unit comprises a plurality of the infrared or near-infrared light sources, and wherein the infrared or near-infrared light sources are arranged to at least partially encompass the at least one hair-cutting unit. In the case that the shaving unit comprises at least two hair-cutting units, it may particularly be so that the skin-contacting surface of the skin-contacting member of the at least one skin-heating unit is configured to at least partially encompass each of the at least two hair-cutting units, wherein the at least one skin-heating unit comprises a plurality of the infrared or near-infrared light sources, and wherein the infrared or near-infrared light sources are arranged to at least partially encompass each of the at least two hair-cutting units.

It is advantageous if the infrared or near-infrared light is distributed throughout a skin-facing side of the shaving unit. This may be achieved in various ways. Assuming that the at least one skin-heating unit comprises a plurality of the infrared or near-infrared light sources, it may be beneficial if the infrared or near-infrared light sources are arranged to emit the infrared or near-infrared light via at least two distinct sections of the skin-contacting surface of the skin-contacting member of the at least one skin-heating unit. In the case that the shaving unit comprises three hair-cutting units in an equilateral triangular configuration, it may be so that the at least one skin-heating unit comprises a plurality of the infrared or near-infrared light sources, and that the infrared or near-infrared light sources are arranged to emit the infrared or near-infrared light via a central section of the skin-contacting surface arranged between the hair-cutting units and via peripheral sections of the skin-contacting surface arranged between each of the three different pairs of adjacent hair-cutting units in the equilateral triangular configuration.

In general, it may be practical if the shaving unit comprises at least two hair-cutting units and at least as many skin-heating units. The fact is that in that way, in the context of a shaving unit having a skin-facing and skin-contacting area of a certain size, both an effective shaving process and an effective process of heating and stimulating the skin can be realized.

In the shaving unit according to the invention, the skin-contacting member of the at least one skin-heating unit may serve for one or more other purposes than emitting infrared or near-infrared light to the skin and heating the skin through contact to the skin. In particular, the skin-contacting member of the at least one skin-heating unit may be configured to at least partially support the at least one hair-cutting unit, given the fact that the skin-contacting surface of the skin-contacting member is arranged adjacent to the at least one hair-cutting unit.

The invention is applicable in the context of various options in respect of the way in which the at least one hair-cutting unit is arranged in the shaving unit. For example, it is possible to have a configuration of the shaving unit in which the at least one hair-cutting unit is mounted in a generally ring-shaped member that is pivotably arranged relative to the base member of the shaving unit and that is configured to contact the skin during use of the shaving unit, and in which the at least one skin-heating unit is arranged in the ring-shaped member. Such a pivotably arranged ring-shaped member is commonly used in electric shavers of the rotary type and allows the at least one hair-cutting unit to follow the local contours of the skin by pivoting relative to the base member together with the ring-shaped member.

In a practical embodiment, the at least one skin-heating unit comprises a molded part and a PCB (printed circuit board) carrying the at least one infrared or near-infrared light source, wherein the PCB is arranged in the molded part and the molded part is filled with a potting material. In this embodiment, it may further be so that electric wires are connected to the PCB and extend through the potting material so as to enable electric contact to the PCB. In any case, in this embodiment, the PCB and the at least one infrared or near-infrared light source are protected from environmental influences. The molded part may form the skin-contacting member and, thus, may comprise the skin-contacting surface. Alternatively, the molded part may be arranged in direct thermal contact with the skin-contacting member. The molded part and the potting material effectively dissipate the thermal energy generated by the at least one infrared or near-infrared light source carried by the PCB and effectively conduct said thermal energy to the skin-contacting surface.

Infrared or near-infrared light cannot be seen by humans. In order to indicate an operational status of the at least one skin-heating unit to a user of the shaving unit, use can be made of visible light. In this respect, the invention covers a shaving unit that further comprises at least one indicator element configured to emit visible light via the skin-contacting surface of the skin-contacting member of the at least one skin-heating unit when the at least one infrared or near-infrared light source emits the infrared or near-infrared light. The at least one indicator element may have any suitable position in the shaving unit, for example adjacent to or between the infrared or near-infrared light sources, and may have a function of indicating an on/off status of the at least one skin-heating unit and possibly also a more sophisticated function such as a function of indicating intensity of the heat/light.

The invention further relates to an electric shaver comprising a main body and a shaving unit as defined in the foregoing, i.e. a shaving unit comprising at least one skin-heating unit besides at least one hair-cutting unit and a base member.

According to one practical option, the at least one skin-heating unit of the shaving unit is supported by the base member of the shaving unit. In the electric shaver, it may be so that the base member is movable relative to the main body from an operational position to a non-operational position and vice versa by being removably or hingably coupled to the main body. In such a case, assuming that the shaving unit comprises an electric system configured to convey electric power to the at least one infrared or near-infrared light source of the at least one skin-heating unit, it is practical if the electric system comprises at least one connection/disconnection area configured to establish electric connection of the electric system to a power-supplying system included in the main body when the base member of the shaving unit is moved from the non-operational position to the operational position and to allow for electric disconnection of the electric system from the power-supplying system when the base member of the shaving unit is moved from the operational position to the non-operational position. The at least one connection/disconnection area of the electric system of the shaving unit may be of any appropriate design. For example, it may be so that the at least one connection/disconnection area of the electric system of the shaving unit comprises a hingably arranged and/or resilient member, and/or a member configured to engage with and disengage from a hingably arranged and/or resilient member.

Likewise, assuming that the shaving unit comprises a data supplying system configured to supply data about one or more parameters measured at the position of the shaving unit, which data may be provided by one or more sensors in the shaving unit, it is practical if the data supplying system comprises at least one connection/disconnection area configured to establish a data connection of the data supplying system to a controller included in the main body when the base member of the shaving unit is moved from the non-operational position to the operational position and to allow for disconnection of the data supplying system from the controller when the base member of the shaving unit is moved from the operational position to the non-operational position. The at least one connection/disconnection area of the data supplying system of the shaving unit may be of any appropriate design. For example, it may be so that the at least one connection/disconnection area of the data supplying system of the shaving unit comprises a hingably arranged and/or resilient member, and/or a member configured to engage with and disengage from a hingably arranged and/or resilient member. The at least one connection/disconnection area of the data supplying system may be combined with the above-described at least one connection/disconnection area of the electric system.

The invention covers embodiments of an electric shaver in which the at least one skin-heating unit of the shaving unit is mounted to the base member of the shaving unit. Further, it is possible to have an electric shaver in which the base member of the shaving unit is movable relative to the main body from an operational position to a non-operational position and vice versa by being removably or hingably coupled to the main body, as suggested in the foregoing, and in which the at least one skin-heating unit of the shaving unit is mounted on the main body, wherein the base member of the shaving unit has at least one recess through which the at least one skin-heating unit extends when the base member is in the operational position.

The invention covers various ways in which operation of the at least one skin-heating unit may be controlled. For example, it is possible to have manual control of the at least one skin-heating unit, wherein a user is allowed to switch the at least one skin-heating unit on and off according to desire and/or to control light intensity. It is also possible to have automatic control of the at least one skin-heating unit, wherein it may be so that the at least one skin-heating unit is switched on and off along with the at least one hair-cutting unit, for example. It may be practical if the main body of an electric shaver according to the invention is equipped with a user interface such as a button or a touchscreen, by means of which a user is enabled to control the on/off status of the at least one skin-heating unit and/or to set the light intensity and/or to select an automatic operation mode etc.

The above-described and other aspects of the invention will be apparent from and elucidated with reference to the following detailed description of practical embodiments of an electric shaver that is equipped with at least one skin-heating unit having infrared or near-infrared light sources.

BRIEF DESCRIPTION OF THE DRAWINGS

The invention will now be explained in greater detail with reference to the figures, in which equal or similar parts are indicated by the same reference signs, and in which:

FIG. 1 diagrammatically shows an electric shaver according to a first embodiment of the invention, FIG. 2 diagrammatically shows a shaving unit of an electric shaver according to a second embodiment of the invention, FIG. 3 diagrammatically shows a shaving unit and a part of a main body of an electric shaver according to a third embodiment of the invention, FIGS. 4 and 5 diagrammatically show a shaving unit and a part of a main body of an electric shaver according to a fourth embodiment of the invention, wherein a non-operational position of a base member of the shaving unit is illustrated in FIG. 5, FIG. 6 relates to an option of the base member of a shaving unit being removably or hingably coupled to a main body and diagrammatically shows a cross-section of parts of the shaving unit and the main body, and FIG. 7 diagrammatically shows an embodiment of a skin-heating unit as included in the electric shaver according to the invention.

DETAILED DESCRIPTION OF THE EMBODIMENTS

Figure 3:
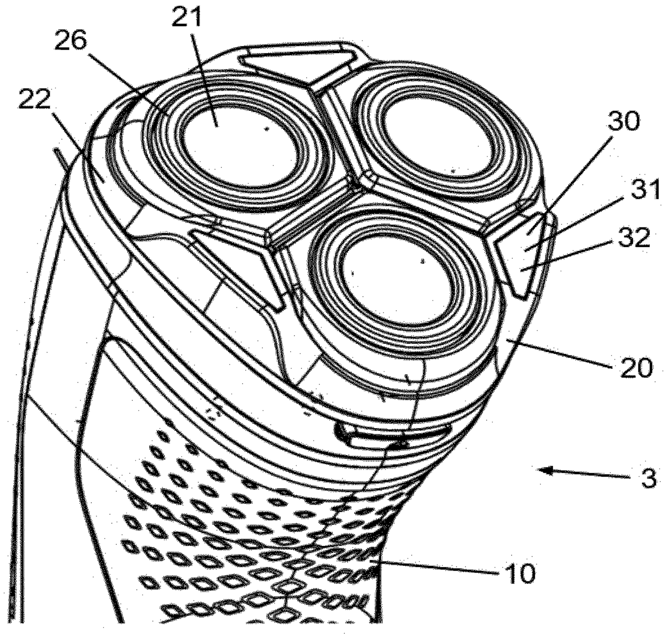

FIG. 1 diagrammatically shows an electric shaver 1 according to a first embodiment of the invention. In the shown example, the electric shaver 1 is of the rotary type and comprises a main body 10 that is intended to be taken hold of by a user of the shaver 1, and a shaving unit 20 that is intended to contact a portion of skin to be subjected to a shaving action. The main body 10 of the shaver 1 is also commonly referred to as handle, and the shaving unit 20 of the shaver 1 is also commonly referred to as head. For various reasons such as a need to service and/or clean the shaving unit 20, a need to replace the shaving unit 20 by a unit of another type, etc., it is practical if the shaving unit 20 is removably or hingably mounted to the main body 10. The shaving unit 20 includes a number of hair-cutting units 21, the number being three in the shown example. When the electric shaver 1 is applied for the purpose of subjecting a portion of skin to a shaving action, the actual process of cutting off hairs protruding from the portion of skin takes place at the position of the hair-cutting units 21. For the purpose of supporting the hair-cutting units 21, the shaving unit 20 comprises a base member 22.

Each of the hair-cutting units 21 comprises a combination of an external cutting member 23 that is of a generally cup-shaped design and an internal cutting member (not shown) that is equipped with at least one hair-cutting member and that is at least partially accommodated in the interior of the internal cutting member 23. The external cutting member 23 has hair-entry openings 24 in an annular cutting track surface 25. During a shaving action, hairs extending through the hair-entry openings 24 and protruding to the interior of the external cutting member 23 are cut off as soon as they are encountered by a hair-cutting element of the internal cutting member. A shaving action as mentioned can be performed when the internal cutting member is activated to rotate and a portion of skin is actually contacted by the external cutting member 23 at the position of the cutting track surface 25. Activation of the internal cutting member may take place in a known manner by means of a drive mechanism of the shaver 1. When the combination of the external cutting member 23 and the internal cutting member is moved over the portion of skin while the internal cutting member is driven to rotate, it is achieved that hairs protruding from the portion of skin are caught in the hair-entry openings 24 of the external cutting member 23 and are cut off in that position.

It is to be noted that the foregoing general information about the electric shaver 1 according to the first embodiment of the invention is applicable to the electric shavers 2, 3, 4 according to the other embodiments as will be described in the following as well.

In the electric shaver 1 according to the first embodiment of the invention, the shaving unit 20 comprises a skin-heating unit 30 that serves for emitting infrared or near-infrared light to the skin and to heat the skin. The skin-heating unit 30 comprises a skin-contacting member 31 having a skin-contacting surface 32 that is arranged adjacent to the hair-cutting units 21 to contact the skin during a shaving action. Further, the skin-heating unit 30 comprises infrared or near-infrared light sources 33, which will hereinafter be simply referred to as light sources 33 for the sake of clarity, and which may comprise LEDs, for example. The light sources 33 are integrated in the skin-contacting member 31, wherein the light sources 33 are both thermally coupled to the skin-contacting surface 32 and arranged to emit infrared or near-infrared light via the skin-contacting surface 32. For example, the skin-contacting member 32 may comprise material that is transparent to the infrared or near-infrared light and the light sources 33 may be embedded in the material. When the skin-heating unit 30 is activated during a shaving action, it is achieved that the skin is subjected to more actions besides the shaving action, particular actions in which the skin is stimulated and heated, which may lead to improvement of the condition/appearance of the skin and also to improvement of shaving comfort.

It is noted that the skin-heating unit 30 is configured to actually realize transfer of heat to the skin on the basis of both conduction and radiation. In view of the conduction aspect, it is advantageous if the design of the skin-heating unit 30 (or a collection of skin-heating units 30) is chosen so as to enable contact to the skin over an area of considerable size so that heat can be spread and hot spots can be avoided. This implies that it is generally advantageous to have a plurality of light sources 33 in the shaving unit 20. In view of the radiation aspect, it is advantageous if the wavelength of the light emitted by the light sources 33 is chosen so as to enable deep skin penetration of the light, so that the skin can really be heated from the inside.

In the shown example, the skin-contacting member 31 is provided in the form of a bracket that is arranged to extend between and partially support the three hair-cutting units 21. According to an advantageous option, the skin-contacting member 31 including the light sources 33 is removably or hingably arranged in the shaving unit 20. In order to have a practical distribution of the infrared or near-infrared light, the light sources 33 are arranged to emit the infrared or near-infrared light via a central section 34 of the skin-contacting surface 32 arranged between the hair-cutting units 21 and via peripheral sections 35*a*, 35*b*, 35*c* of the skin-contacting surface 32 arranged between each of the three different pairs of adjacent hair-cutting units 21 in the equilateral triangular configuration.

FIG. 2 diagrammatically shows a shaving unit 20 of an electric shaver 2 according to a second embodiment of the invention. In the shown example, the hair-cutting units 21 are mounted in generally ring-shaped members 26 which are pivotably arranged relative to the base member 22 and which are configured to contact the skin during a shaving action. The ring-shaped members 26 are also commonly referred to as floes and have a function in allowing the hair cutting units 21 to follow the local contours of the skin by pivoting relative to the base member 22 together with the ring-shaped members 26. The hair-cutting unit 21 of the electric shaver 2 according to the second embodiment of the invention comprises the same number of skin-heating units 30 as hair-cutting units 21 and ring-shaped members 26, wherein a skin-heating unit 30 is arranged in each of the ring-shaped members 26, wherein the skin-contacting surface 32 of the skin-contacting member 31 of each of the skin-heating units 30 is configured to partially encompass the respective hair-cutting unit 21, wherein each of the skin-heating units 30 comprises a plurality of light sources 33, and wherein the light sources 33 are arranged to partially encompass the respective hair-cutting unit 21.

FIG. 3 diagrammatically shows a shaving unit 20 and a part of a main body 10 of an electric shaver 3 according to a third embodiment of the invention. As is the case in the shaving unit 20 of the electric shaver 2 according to the second embodiment of the invention, the hair-cutting units 21 are mounted in generally ring-shaped members 26 which are pivotably arranged relative to the base member 22 and which are configured to contact the skin during a shaving action. Also, there are three skin-heating units 30, but the skin-heating units 30 are not arranged in the ring-shaped members 26. Instead, the skin-heating units 30 are arranged in the base member 22, at peripheral positions between each of the three different pairs of adjacent hair-cutting units 21 in the equilateral triangular configuration.

Figure 4:
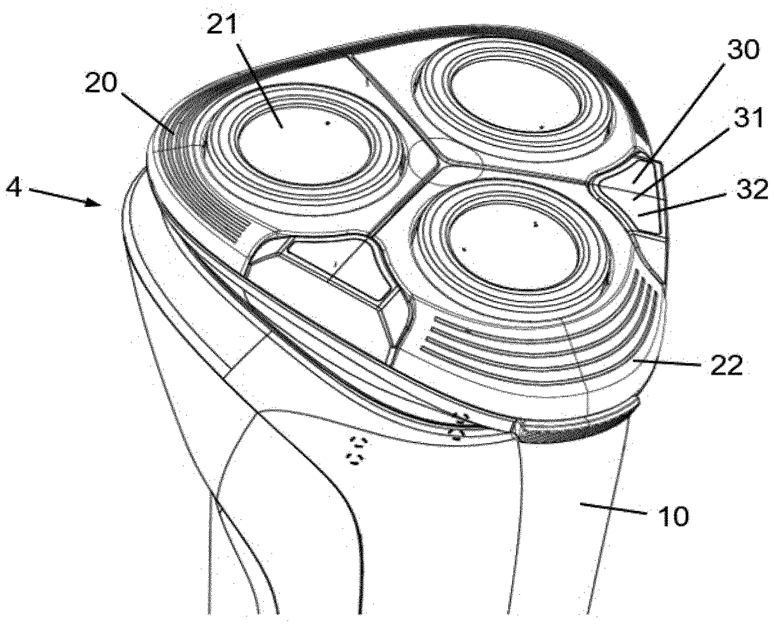
Figure 5:
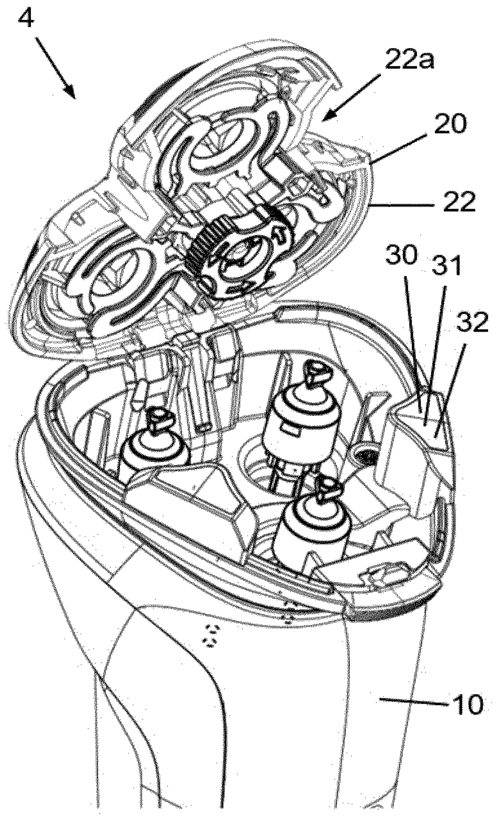

FIGS. 4 and 5 diagrammatically shows a shaving unit 20 and a part of a main body 10 of an electric shaver 4 according to a fourth embodiment of the invention. In the electric shaver 4 according to the fourth embodiment of the invention, the skin-heating units 30 of the shaving unit 20 are mounted on the main body 10. The base member 22 of the shaving unit 20 has recesses 22*a* through which the skin-heating units 30 extend when the base member 20 is in position on the main body 10. In the shown example, the base member 22 is movable relative to the main body 10 from an operational position as shown in FIG. 4 to a non-operational position and vice versa by being hingably coupled to the main body 10, wherein it is noted that FIG. 5 relates to the situation of the base member 22 including the hair-cutting units 21 being hinged to the non-operational position. Alternatively, it is possible that the base member 22 is removably coupled to the main body 10.

Figure 6:
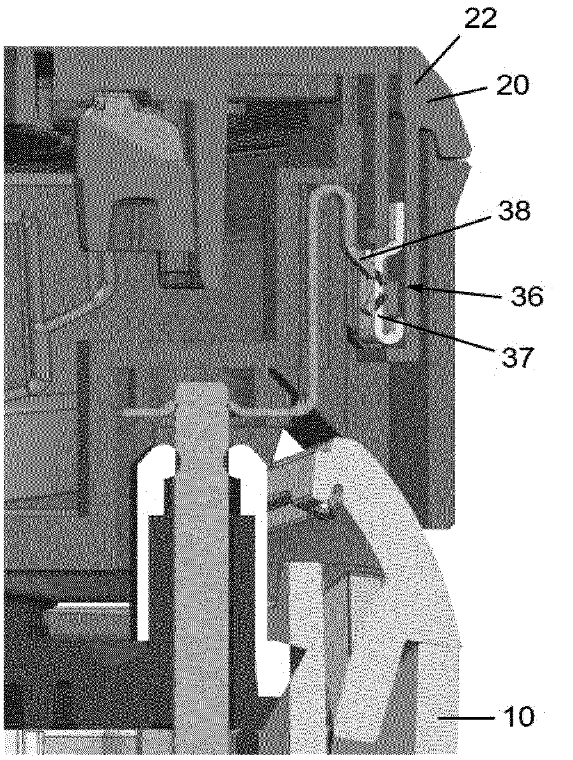

In the above-described case of the electric shaver 4 according to the fourth embodiment of the invention, the skin-heating units 30 are fixed on the main body 10. Assuming that electric power as necessary for operating the light sources 33 of the skin-heating units 30 is taken from a power-supplying system included in the main body 10, it is possible to simply have a direct electric connection of the light sources 33 to that power-supplying system in that particular case. However, in cases of the skin-heating units 30 being supported by the base member 22 of the shaving unit 20 and the base member 22 being movable relative to the main body 10 from an operational position to a non-operational position and vice versa by being removably or hingably coupled to the main body 10, it is not possible to have a direct electric connection. With reference to FIG. 6, it is noted that in those cases, it may be so that the shaving unit 20 comprises an electric system configured to convey electric power to the light sources 33, wherein the electric system comprises at least one connection/disconnection area 36 configured to establish electric connection of the electric system to the power-supplying system included in the main body 10 when the base member 22 of the shaving unit 20 is moved from the non-operational position to the operational position and to allow for electric disconnection of the electric system from the power-supplying system when the base member 22 of the shaving unit 20 is moved from the operational position to the non-operational position.

Members arranged on the main body 10 and the shaving unit 20, respectively, and configured to be involved in establishing electric connection and allowing for electric disconnection in the way as described in the foregoing can be of any suitable design. FIG. 6 illustrates an option according to which the connection/disconnection area 36 of the electric system of the shaving unit 20 comprises a fixed metal contact 37 that is configured to engage with and disengage from a metal leaf spring 38 that is located in the main body 10 and that is at an end position of the power-supplying system included in the main body 10. In general, it is advantageous if the members as mentioned are in a movable/hingable arrangement or have resilient properties.

In a similar manner as described in the foregoing with respect to the electric system, it may be so that the shaving unit 20 comprises a data supplying system configured to supply data about one or more parameters measured at the position of the shaving unit 20, which data may be provided by one or more sensors in the shaving unit 20, wherein the data supplying system comprises at least one connection/disconnection area configured to establish a data connection of the data supplying system to a controller included in the main body 10 when the base member 22 of the shaving unit 20 is moved from the non-operational position to the operational position and to allow for disconnection of the data supplying system from the controller when the base member 22 of the shaving unit 20 is moved from the operational position to the non-operational position. For example, it may be useful to have a functionality of determining a temperature at one or more positions on the shaving unit 20 during a shaving action, and to process information about the temperature for the purpose of controlling operation of the light sources 33 of the skin-heating units 30. It may be practical if the at least one connection/disconnection area of the data supplying system is combined with the at least one connection/disconnection area 36 of the electric system.

Figure 7:
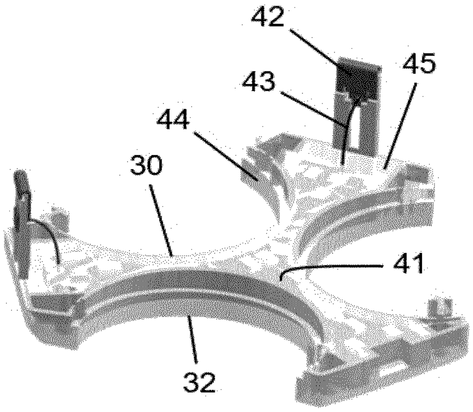

The skin-heating units 30 can be of any suitable design. A practical embodiment of a skin-heating unit 30 is diagrammatically shown in FIG. 7, wherein it is noted that the skin-heating unit 30 is depicted with the skin-contacting surface 32 down. In this embodiment, the skin-heating unit 30 comprises a PCB 41, two connector plates 42 and two wires 43 connecting the connector plates 42 to the PCB 41, wherein the light sources 33 are arranged on the PCB 41, at the side of the skin-contacting surface 32, i.e. the other side of the PCB 41 than the one that is visible in the figure. The assembly of the PCB 41 carrying the light sources 33, the connector plates 42 and the wires 43 are placed on a molded part 44, which may be a polycarbonate/polyester molded part, for example. The molded part 44 is filled with a potting material 45 such as silicon/PU so that the PCB 41 and the light sources 33 are completely embedded in the potting material 45 and thereby protected from environmental influences. The wires 43 extend through the potting material 45 and the connector plates 42 are outside of the potting material 45 so that the PCB 41 carrying the light sources 33 is electrically accessible from the outside. The use of potting material 45 is advantageous when it comes to factors such as transmittance of the infrared or near-infrared light, impact resistance of the skin-heating unit 30, damping of vibrations as may occur during a shaving process, and dissipation of heat from the light sources 33.

It will be clear to a person skilled in the art that the scope of the invention is not limited to the examples discussed in the foregoing, but that several amendments and modifications thereof are possible without deviating from the scope of the invention as defined in the attached claims. It is intended that the invention be construed as including all such amendments and modifications insofar they come within the scope of the claims or the equivalents thereof. While the invention has been illustrated and described in detail in the figures and the description, such illustration and description are to be considered illustrative or exemplary only, and not restrictive. The invention is not limited to the disclosed embodiments. The drawings are schematic, wherein details which are not required for understanding the invention may have been omitted, and not necessarily to scale.

Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. Any reference signs in the claims should not be construed as limiting the scope of the invention.

Elements and aspects discussed for or in relation with a particular embodiment may be suitably combined with elements and aspects of other embodiments, unless explicitly stated otherwise. Thus, the mere fact that certain measures are recited in mutually different dependent claims does not indicate that a combination of these measures cannot be used to advantage.

The terms "comprise" and "include" as used in this text will be understood by a person skilled in the art as covering the term "consist of". Hence, the term "comprise" or "include" may in respect of an embodiment mean "consist of", but may in another embodiment mean "contain/have/be equipped with at least the defined species and optionally one or more other species".

Notable aspects of the invention are summarized as follows. A shaving unit 20 for use in an electric shaver 1, 2, 3, 4 comprises at least one hair-cutting unit 21 comprising an external cutting member 23 having hair-entry openings 24 in a cutting track surface 25 and an internal cutting member having at least one hair-cutting element and being movable relative to the external cutting member 23, and a base member 22 supporting the at least one hair-cutting unit 21. The shaving unit 20 further comprises at least one skin-heating unit 30 comprising a skin-contacting member 31 having a skin-contacting surface 32 arranged adjacent to the at least one hair-cutting unit 21 to contact the skin during use of the shaving unit 20, and at least one infrared or near-infrared light source 33 integrated in the skin-contacting member 31, thermally coupled to the skin-contacting surface 32 and arranged to emit infrared or near-infrared light via the skin-contacting surface 32. An important advantage of the configuration of the at least one skin-heating unit 30, particularly the fact that the at least one skin-heating unit comprises a member 31 that is configured to contact the skin, is that the heat generated by the at least one light source 33 is efficiently transferred to the skin and that the infrared or near-infrared light emitted by the at least one light source directly reaches the skin and penetrates into the skin. In this respect, it is noted that it is practical if the skin-contacting surface 32 of the skin-contacting member 31 of the at least one skin-heating unit 30 is at a substantially similar level as the cutting track surface 25 of the external cutting member 23 of the at least one hair-cutting unit 21.

The invention claimed is:

1. A shaving unit, comprising:

at least one hair-cutting unit comprising an external cutting member having hair-entry openings in a cutting track surface and an internal cutting member having at least one hair-cutting element and being movable relative to the external cutting member;

a base member supporting the at least one hair-cutting unit; and at least one skin-heating unit comprising at least one infrared or near-infrared light source arranged to emit infrared or near-infrared light;

wherein:

the at least one skin-heating unit further comprises a skin-contacting member having a skin-contacting surface arranged adjacent to the at least one hair-cutting unit to contact the skin during use of the shaving unit; and the at least one infrared or near-infrared light source is integrated in the skin-contacting member, thermally coupled to the skin-contacting surface and arranged to emit the infrared or near-infrared light via the skin-contacting surface.

2. The shaving unit according to claim 1, wherein the skin-contacting surface of the skin-contacting member of the at least one skin-heating unit is arranged to at least partially encompass the at least one hair-cutting unit, wherein the at least one skin-heating unit comprises a plurality of infrared or near-infrared light sources arranged to at least partially encompass the at least one hair-cutting unit.

3. The shaving unit according to claim 1, wherein the at least one hair-cutting unit comprises at least two hair-cutting units, wherein the skin-contacting surface of the skin-contacting member of the at least one skin-heating unit is configured to at least partially encompass each of the at least two hair-cutting units, wherein the at least one skin-heating unit comprises a plurality of infrared or near-infrared light sources are arranged to at least partially encompass each of the at least two hair-cutting units.

4. The shaving unit according to claim 1, wherein the at least one skin-heating unit comprises a plurality of infrared or near-infrared light sources arranged to emit the infrared or near-infrared light via at least two distinct sections of the skin-contacting surface of the skin-contacting member of the at least one skin-heating unit.

5. The shaving unit according to claim 1, wherein the at least one hair-cutting unit comprises three hair-cutting units in an equilateral triangular configuration, wherein the at least one skin-heating unit comprises a plurality of infrared or near-infrared light sources arranged to emit the infrared or near-infrared light via a central section of the skin-contacting surface arranged between the three hair-cutting units and via peripheral sections of the skin-contacting surface arranged between each of the three hair-cutting units in the equilateral triangular configuration.

6. The shaving unit according to claim 1, wherein the at least one hair-cutting unit comprises at least two hair-cutting units and the at least one skin-heating unit comprises at least two skin-heating units.

7. The shaving unit according to claim 1, wherein the skin-contacting member of the at least one skin-heating unit is configured to at least partially support the at least one hair-cutting unit.

8. The shaving unit according to claim 1, wherein the at least one hair-cutting unit is mounted in a generally ring-shaped member that is pivotably arranged relative to the base member of the shaving unit and that is configured to contact the skin during use of the shaving unit, and wherein the at least one skin-heating unit is arranged in the generally ring-shaped member.

9. The shaving unit according to claim 1, wherein the at least one skin-heating unit comprises a molded part and a printed circuit board (PCB) carrying the at least one infrared or near-infrared light source, and wherein the PCB is arranged in the molded part and the molded part is filled with a potting material.

10. The shaving unit according to claim 1, further comprising at least one indicator element configured to emit visible light via the skin-contacting surface of the skin-contacting member of the at least one skin-heating unit when the at least one infrared or near-infrared light source emits the infrared or near-infrared light.

11. An electric shaver comprising a main body and a shaving unit according to claim 1.

12. The electric shaver according to claim 11, wherein the at least one skin-heating unit of the shaving unit is supported by the base member of the shaving unit, and wherein the base member is movable relative to the main body from an operational position to a non-operational position and vice versa by being removably or hingeably coupled to the main body, and wherein the shaving unit comprises an electric system configured to convey electric power to the at least one infrared or near-infrared light source of the at least one skin-heating unit, wherein the electric system comprises at least one connection/disconnection area configured to establish electric connection of the electric system to a power-supplying system included in the main body when the base member of the shaving unit is moved from the non-operational position to the operational position and to allow for electric disconnection of the electric system from the power-supplying system when the base member of the shaving unit is moved from the operational position to the non-operational position.

13. The electric shaver according to claim 12, wherein the at least one connection/disconnection area of the electric system of the shaving unit comprises a hingably arranged and/or resilient member, and/or a member configured to engage with and disengage from a hingably arranged and/or resilient member.

14. An electric shaver comprising a main body and a shaving unit according to claim 1, wherein the base member of the shaving unit is movable relative to the main body from an operational position to a non-operational position and vice versa by being removably or hingeably coupled to the main body, wherein the at least one skin-heating unit of the shaving unit is mounted on the main body, and wherein the base member of the shaving unit has at least one recess through which the at least one skin-heating unit extends when the base member is in the operational position.

* * * * *